(12) United States Patent
Wood

(10) Patent No.: US 7,118,452 B2
(45) Date of Patent: Oct. 10, 2006

(54) PNEUMATICALLY ACTUATED FLEXIBLE COUPLING END EFFECTORS FOR LAPPING/POLISHING

(75) Inventor: Jeffrey H. Wood, Eureka, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/777,388

(22) Filed: Feb. 12, 2004

(65) Prior Publication Data
US 2005/0181707 A1    Aug. 18, 2005

(51) Int. Cl.
*B24B 49/08* (2006.01)
*B24B 19/26* (2006.01)

(52) U.S. Cl. .............................. 451/11; 451/65; 451/158

(58) Field of Classification Search ..................... 451/5, 451/11, 41, 57, 65, 158, 259, 354
See application file for complete search history.

(56) References Cited

U.S. PATENT DOCUMENTS

| | | | |
|---|---|---|---|
| 157,261 A | 11/1874 | Wood | |
| 292,677 A | 1/1884 | Pierron | |
| 1,429,819 A | 9/1922 | Worth | |
| 2,291,000 A | 7/1942 | Simpson | |
| 2,655,769 A | 10/1953 | Lewis | |
| 2,655,772 A | 10/1953 | Lewis | |
| 2,822,647 A | 2/1958 | Rips et al. | |
| 3,093,939 A | 6/1963 | Dalton | |
| 3,258,879 A | 7/1966 | Edelstein | |
| 3,517,466 A | 6/1970 | Bouvier | |
| 3,583,111 A | 6/1971 | Volk | |
| 3,653,857 A | 4/1972 | Field | |
| 3,939,610 A * | 2/1976 | Suzuki et al. ................ | 451/160 |
| 4,490,948 A | 1/1985 | Hanstein et al. | |
| 4,510,718 A | 4/1985 | Eichenlaub | |
| 4,682,444 A | 7/1987 | Judge et al. | |
| 4,860,500 A * | 8/1989 | Thompson .................... | 451/11 |
| 4,974,368 A | 12/1990 | Miyamoto et al. | |
| 5,016,399 A | 5/1991 | Vinson | |
| 5,067,085 A * | 11/1991 | Wenzel et al. ............... | 700/164 |
| 5,129,044 A | 7/1992 | Kashiwagi et al. | |
| 5,138,798 A | 8/1992 | Volat | |
| 5,138,800 A * | 8/1992 | Janusz ........................... | 451/5 |
| 5,231,803 A * | 8/1993 | Lanzer ......................... | 451/28 |
| 5,287,658 A | 2/1994 | Attansio et al. | |
| 5,377,455 A * | 1/1995 | Lanzer .......................... | 451/5 |
| 5,482,496 A * | 1/1996 | Lanzer ........................... | 451/5 |
| 5,497,061 A | 3/1996 | Nonaka et al. | |
| 5,509,848 A * | 4/1996 | Shimbara ..................... | 451/24 |

(Continued)

FOREIGN PATENT DOCUMENTS

DE          42 07 998          9/1993

(Continued)

*Primary Examiner*—David B. Thomas
(74) *Attorney, Agent, or Firm*—Lee & Hayes PLLC

(57) ABSTRACT

Methods and apparatus for end effectors for performing surface lapping using a robotic system are provided. In one embodiment, a lapping system includes a robotic arm and a pneumatic end effector unit. The pneumatic end effector unit includes a first base attached to the robotic arm, a second base, a lapping pad attachable to the second base, and a pneumatic piston system coupled between the first and second bases. An abrasive pad is attached to the lapping pad with a layer of pitch. The pneumatic piston system includes a piston chamber, a piston being slideably received within the piston chamber, and a component for controlling air pressure within the piston chamber. A slurry system introduces a slurry compound into one of the second base or the lapping pad.

17 Claims, 6 Drawing Sheets

U.S. PATENT DOCUMENTS

| | | |
|---|---|---|
| 5,584,898 A | 12/1996 | Fulton |
| 5,738,568 A | 4/1998 | Jurjevic et al. |
| 5,814,959 A | 9/1998 | Nonaka et al. |
| 5,931,722 A * | 8/1999 | Ohmi et al. ............... 451/271 |
| 5,964,645 A * | 10/1999 | Jemt ........................ 451/41 |
| 6,247,999 B1 | 6/2001 | Tokiwa |
| 6,264,534 B1 * | 7/2001 | Panyard et al. ............ 451/11 |
| 6,312,316 B1 | 11/2001 | Takahashi et al. |
| 6,379,221 B1 | 4/2002 | Kennedy et al. |
| 6,390,888 B1 * | 5/2002 | Amano et al. ............. 451/24 |
| 6,773,339 B1 | 8/2004 | Cooper et al. |
| 6,918,822 B1 | 7/2005 | Arai et al. |
| 6,921,317 B1 * | 7/2005 | Wood et al. ................ 451/5 |
| 6,942,554 B1 | 9/2005 | Mandina |
| 2002/0072297 A1 | 6/2002 | Kennerknecht et al. |
| 2004/0102135 A1 * | 5/2004 | Wood et al. ................ 451/5 |
| 2004/0102136 A1 * | 5/2004 | Wood et al. ................ 451/5 |
| 2004/0102140 A1 * | 5/2004 | Wood et al. ............... 451/41 |

FOREIGN PATENT DOCUMENTS

| | | |
|---|---|---|
| EP | 444657 A1 * | 9/1991 |
| JP | 60155356 | 8/1985 |
| JP | 03234460 A * | 10/1991 |
| JP | 03256682 A * | 11/1991 |
| JP | 04002460 | 1/1992 |
| JP | 06339885 | 12/1994 |
| JP | 1029149 | 2/1998 |
| JP | 10151556 | 6/1998 |

* cited by examiner

US 7,118,452 B2

PNEUMATICALLY ACTUATED FLEXIBLE COUPLING END EFFECTORS FOR LAPPING/POLISHING

GOVERNMENT LICENSE RIGHTS

This invention was made with Government support under U.S. Government contract F33615-97-2-3400 awarded by United States Air Force. The Government has certain rights in this invention.

RELATED APPLICATIONS

This patent application is related to copending, commonly-owned patent applications entitled "Contour Following End Effectors For Lapping/Polishing" U.S. patent application Ser. No. 10/301,999, filed Nov. 21, 2002, "Spring-Loaded Contour Following End Effectors for Lapping/Polishing", U.S. patent application Ser. No. 10/302,042, filed Nov. 21, 2002, and "Automated Lapping System", U.S. patent application Ser. No. 10/302,000, filed Nov. 21, 2002, which are hereby incorporated by reference.

FIELD OF THE INVENTION

This invention relates generally to lapping and polishing surfaces and, more specifically, to robotic lapping and polishing.

BACKGROUND OF THE INVENTION

Injection-molded aircraft canopies and windshields offer tremendous benefits to aircraft in cost, weight, and impact tolerance. A major cost in this manufacturing process is the injection mold itself. Surfaces of canopies and windshields are finished to a quality similar to an optic lens in order to prevent pilots from being subjected to visual distortion.

The precise optics for canopies and windshields are built into the injection mold. The injection molds are lapped or polished by hand, section by section, using a diamond plated lapping material. Hand polishing or lapping an injection mold takes several man-years to accomplish. Thus, lapping or polishing is very costly. Hand polishing or lapping also does not always ensure that the precise, optic surface finish quality has been met.

Therefore, there exists an unmet need to reduce the cost and increase the accuracy of lapping or polishing.

SUMMARY OF THE INVENTION

The present invention provides end effectors for performing surface lapping using a robotic system. The robotic system includes a robotic arm and a pneumatic end effector unit. The pneumatic end effector unit includes a first base attached to the robotic arm, a second base, a lapping pad attachable to the second base, and a pneumatic piston system coupled between the first and second bases. An abrasive pad is attached to the lapping pad with a layer of pitch.

In one aspect of the invention, the pneumatic piston system includes a piston chamber, a piston being slideably received within the piston chamber, and a component for controlling air pressure within the piston chamber.

In another aspect of the invention, the piston chamber slideably guides the second base.

In still another aspect of the invention, the second base includes a latch that attaches the lapping pad to the second base.

In a further aspect of the invention, a slurry system introduces a slurry compound into one of the second base or the lapping pad.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to apparatus and methods for providing end effectors for performing surface lapping using a robotic system. Many specific details of certain embodiments of the invention are set forth in the following description and in FIGS. 1–6 to provide a thorough understanding of such embodiments. One skilled in the art, however, will understand that the present invention may have additional embodiments, or that the present invention may be practiced without several of the details described in the following description.

Figure 1:
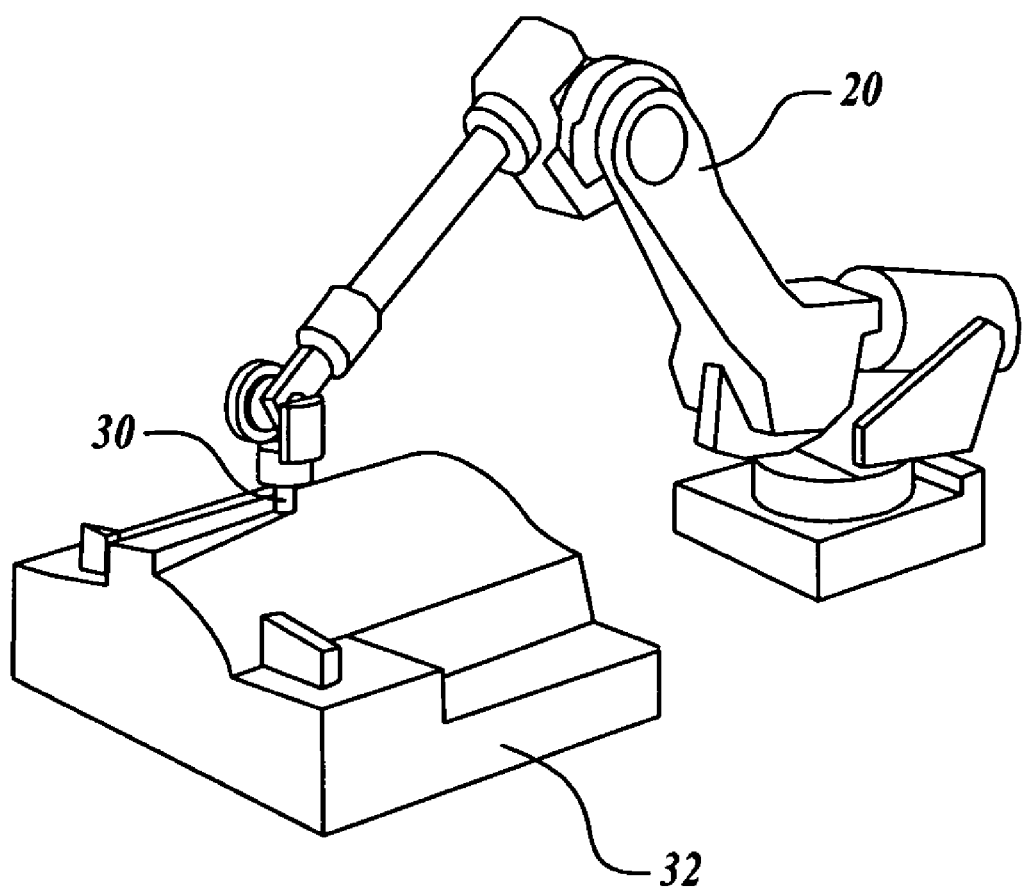
FIG. 1 is a perspective view of an end effector in operation in accordance with an embodiment of the invention.

FIG. 1 shows an embodiment of an end effector 30 in accordance with an embodiment of the present invention that is attached to a robot 20 for polishing and lapping a work product 32. A non-limiting example of the product 32 is a core or cavity injection mold for making polycarbonate aircraft canopies. The work product 32 suitably entails a high degree of polishing or lapping accuracy. For example, precise optical properties for injection molds must be attained in order to produce optically flawless or near-flawless polycarbonate molded canopies. In order to attain this desired level of accuracy, the end effector 30 pivots at an end of the robot 20, but does not rotate about an axis that is perpendicular to a planar surface of the end effector 30. In other words, the end effector 30 maintains a substantially orthogonal position relative to the work product 32.

A non-limiting example of the robot 20 includes a Fanuc, Inc. robot with soft float. Soft float allows the robot 20 to apply pressure to a surface without resulting in undesired shut-offs. Because the robot 20 applies continuous, consistent pressure that far exceeds the capabilities of a human operator, lapping and polishing evolutions take a fraction of the time taken by a human operator.

Figure 2:
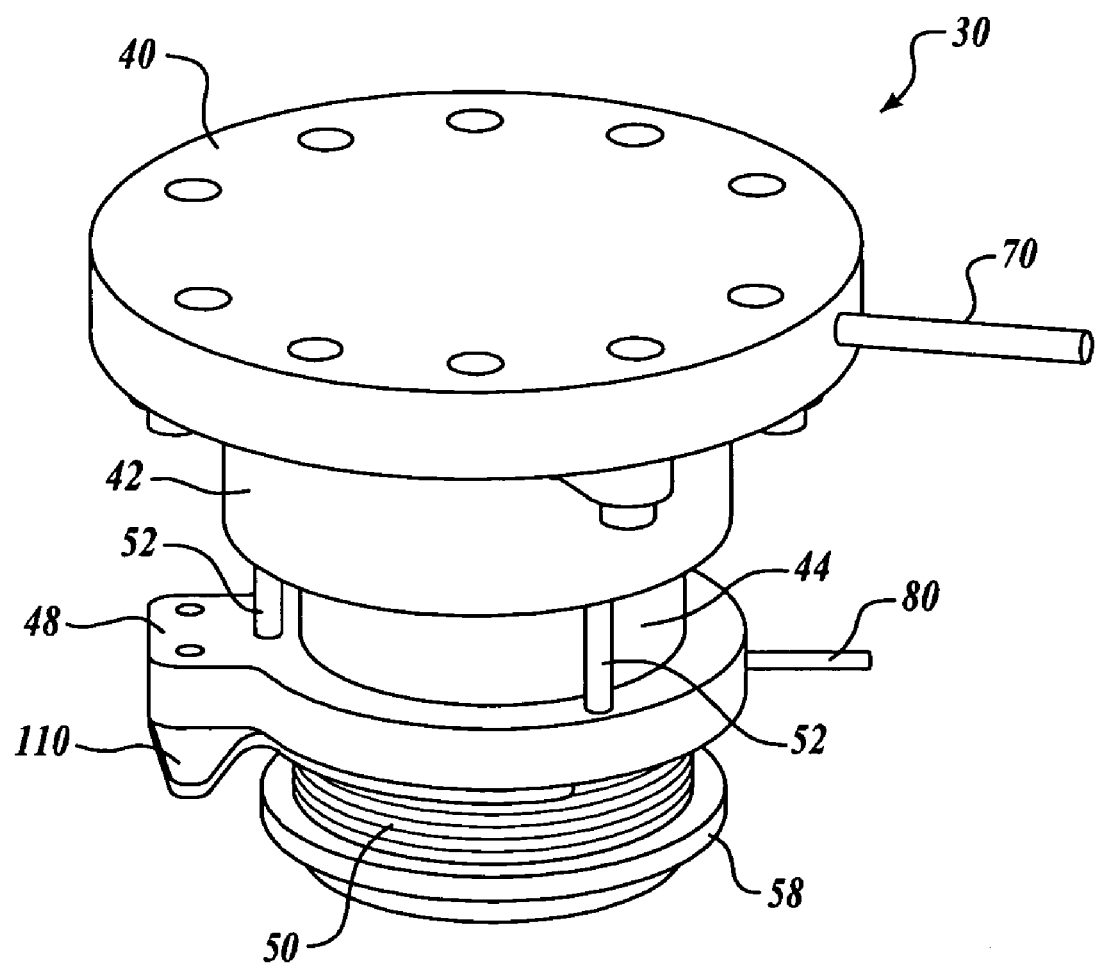
FIG. 2 illustrates a perspective view of an exemplary pneumatic end effector in accordance with an embodiment of the invention.

FIG. 2 illustrates a perspective view of an exemplary pneumatic end effector 30 in accordance with an embodiment of the invention.

Figure 3:
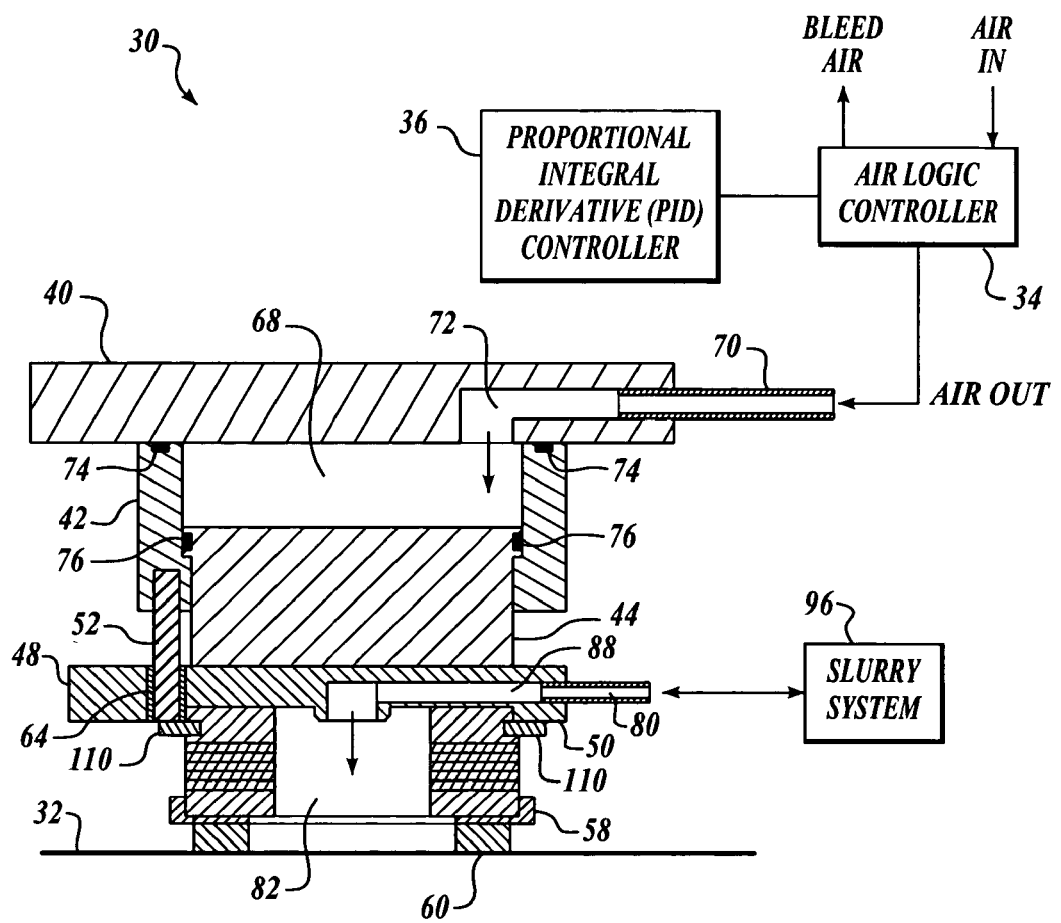
FIG. 3 is a cross-sectional view of the pneumatic end effector shown in FIG. 2.
Figure 4:
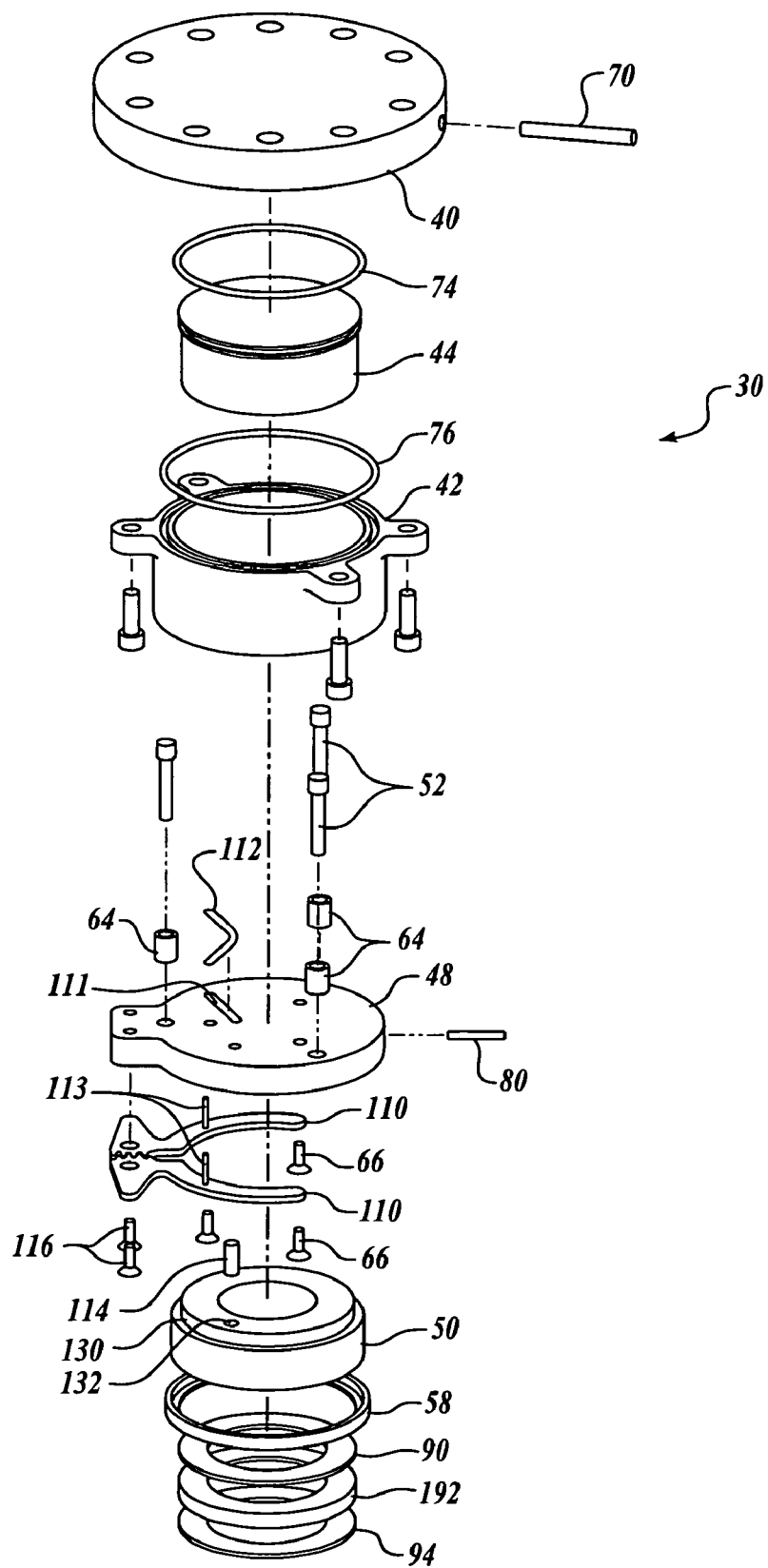
FIG. 4 is an exploded view of exemplary materials layered on an end effector.

FIGS. 3 and 4 illustrate cross-sectional and exploded views, respectively, of the end effector 30 of FIG. 2. As shown in FIG. 3, in one embodiment, the end effector 30 receives compressed air through an air logic controller 34 as controlled by a proportional integral derivative (PID) controller 36. The air logic controller 34 receives high pressure air from a source. The air logic controller 34 provides constant pressure between the end effector flexible coupling member 50 and the work product 32. The PID controller 36 includes a control knob to increase or decrease the air pressure variably by turning the knob. The air logic controller 34 displays a digital readout of the air pressure commanded by the control knob of the PID controller 36 and senses the pressure through the pneumatic tube 70. The sensed pressure is constantly monitored by the PID controller 36. The PID controller 36 compensates for pressure variations by dispensing more or less air pressure through the air logic controller 34 as required to maintain constant pressure at the end effector plate 50.

As further shown in FIGS. 2–4, in this embodiment, the end effector 30 includes a first mounting plate 40, a piston cylinder 42, a piston 44, a second mounting plate 48, and a flexible coupling member 50. In one particular embodiment, the flexible coupling member 50 includes a cross-slotted cylinder that acts as a flexible coupling between the second plate 48 and the abrasive lapping medium. The flexible coupling member 50 may be fabricated out of any suitable semi-rigid material. As described more fully below, the end effector 30 having the flexible coupling member 50 may provide significant advantages over the prior art.

As shown in FIG. 4, the piston cylinder 42 includes a piston cavity 68 that receives the piston 44. An O-ring 76 is positioned around the piston 44 in order to come in contact with the walls of the piston cavity 68 and the piston 44. The second mounting plate 48 includes bushings 64, such as polymer bushings, that are mounted within through-holes of the second mounting plate 48. Guideposts 52 are securely received by the piston cylinder 42. The bushings 64 slideably receive the guideposts 52. The second mounting plate 48 is attached to the piston 44 by a plurality of bolts 66 (FIG. 4).

As best shown in FIG. 4, attached to a lapping end or side of the flexible coupling member 50 is an adhesively bonded polymer bumper 58 for damage control in the event of an abrasive media disbond, flexible adhesive media 90 such as polysulphide or silicone, a layer of pitch 92, and a lapping abrasive 94, such as diamond media plated on a flexible cloth gridwork.

The first mounting plate 40 includes a cavity 72 (FIG. 3) that communicates at one end with the piston cavity 68, and at a second end receives a pneumatic tube 70 that is coupled to the air logic controller 34. Similarly, the second mounting plate 48 includes a slurry cavity 88 that is open at one end to a slurry cavity 82 within the flexible coupling member 50. A second opening of the slurry cavity 88 receives a slurry tube 80 that receives an abrasive/polishing slurry from a slurry system 96. In one embodiment, the slurry system 96 is coupled to a computer controller, such as described in copending patent application Automated Lapping System.

Figure 5A:
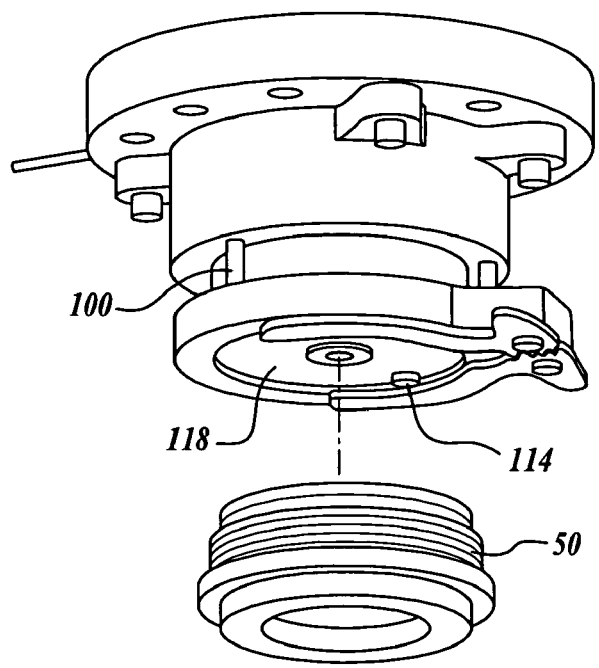
FIGS. 5A–C illustrate perspective and plan views of the end effector shown in FIG. 2.
Figure 5B:
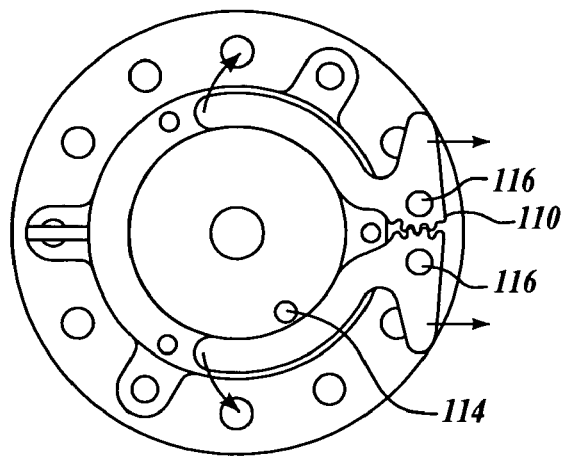
Figure 5C:
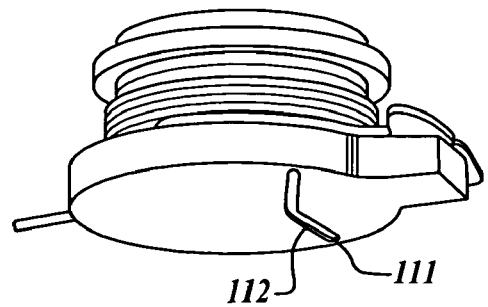

FIGS. 5A–C illustrate perspective and plan views of an embodiment of a latch mechanism 110 that attaches the end effector flexible coupling member 50 to the second mounting plate 48 and thus the piston 44. The latch mechanism 110 includes two halves that are rotatably attached via bolts 116 to a side of the second mounting plate 48 that is opposite the side that is in contact with the piston 44. Each of the halves include coupling gears (FIG. 5B) that cause one of the halves to be activated if the other half is activated. Each of the halves include protruding pins 113 (FIG. 4) that pass through holes in the second mounting plate 48 into a spring cavity 111 that includes a spring 112 (FIGS. 4 and 5C). The spring 112 provides a contracting force on the protruding pins 113 that forces the halves of the latch mechanism 110 into a closed position. The base of the second mounting plate 48 includes a recessed area 118 (FIG. 5A) between the two halves of the latch mechanism 110. The recessed area 118 includes a chocking pin 114. The flexible coupling member 50 includes an external groove 130 and a chocking pin receiving hole 132 (FIG. 4). The flexible coupling member 50 is coupled to the second mounting plate 48 by opening up the latch mechanism 110, inserting the flexible coupling member 50 into the recessed area 118, so that the chocking pin 114 is received by the chocking pin hole 132. Then, the latch mechanism 110 is placed in a closed position whereby portions of each half of the latch mechanism 110 are received within the groove 130.

Figure 6A:
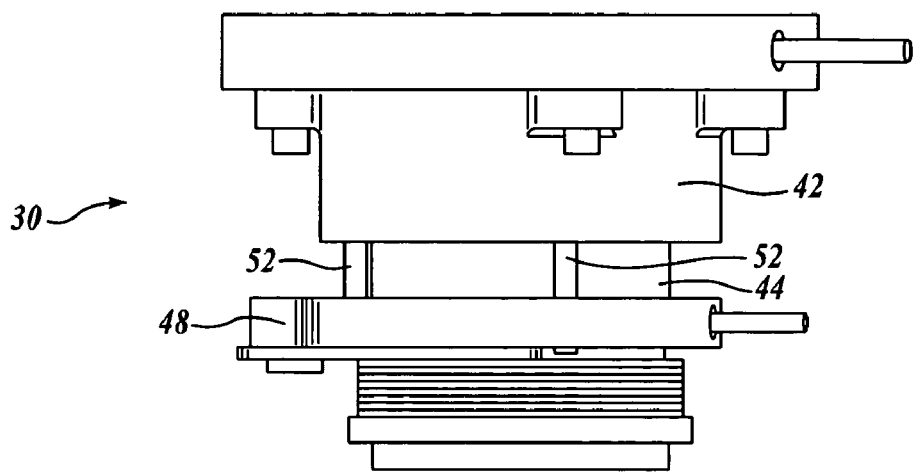
FIGS. 6A and B illustrate side views of the end effector shown in FIG. 2.
Figure 6B:
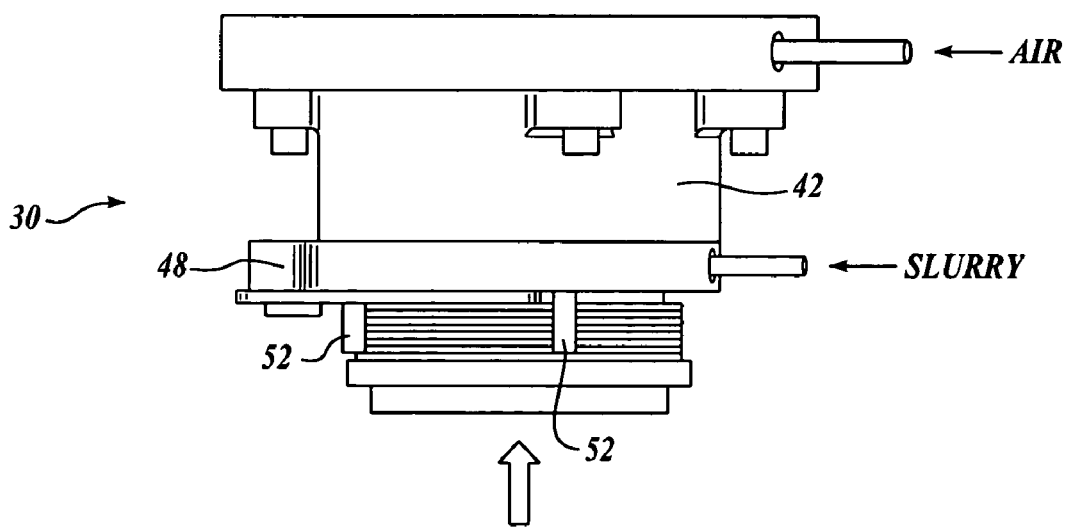

FIG. 6A illustrates a side view of the end effector 30 when the piston 44 is in a non-compressed or partially compressed position. In the non-compressed position the piston 44 extends from the piston cylinder 42 with the second mounting plate 48 being guided by the guide posts 52. FIG. 6B illustrates a side view of the end effector 30 when the piston 44 is in a fully compressed position. In the fully compressed position, the piston 44 is fully received within the piston cylinder 42. The second mounting plate 48 makes contact (or near contact) with the piston cylinder 42 as guided by the guide posts 52.

In operation, the end effector 30 may be positioned proximate the work product 32 by the robot 20 such that the lapping abrasive 94 is engaged against a portion of the work product 32 that is to be polished. As the lapping abrasive 94 engages against the work product 32, a pressure within the piston cavity 68 is controlled via the pneumatic tube 70 by the air logic controller 34 so that the lapping abrasive 94 is applied with a variably adjustable constant force against the work product 32. A flow of abrasive slurry may enter the slurry cavity 82 via the slurry tube 80 from the slurry supply system 96, and may flow onto the work product 32 to facilitate the polishing process.

It will be appreciated that the end effector 30 having the flexible coupling member 50 provides a semi-rigid or flexible coupling between the lapping abrasive 94 and the second plate 48. Thus, the flexible coupling member 50 may flex under pressure to allow the lapping abrasive 94 to at least partially conform to the surface of the work piece 32.

Embodiments of apparatus and methods in accordance with the present invention may provide significant advantages over the prior art. For example, because the end effector 30 includes the flexible coupling member 50 that maintains a semi-rigid state suitable for driving the lapping abrasive 94, yet still allows a degree of flexure between the end effector 30 and the work product 32. Thus, unlike alternate polishing systems that assure normality of the lapping head to the work product 32, the end effector 30 in accordance with the present invention allows the lapping abrasive 94 to conform to the surface of the work product 32.

Furthermore, because the end effector 30 includes a pneumatic piston 44, the force with which the lapping abrasive 94 is applied to the work product 32 may be adjustably controlled to a desired operating pressure that remains constant as the lapping abrasive 94 is applied over various portions of the work product 32. Thus, the polishing of the work product 32 may be performed in a controllable, automated manner, and may thereby improve the quality and reduce the costs associated with the polishing process.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A system for lapping a surface, the system comprising:
   a robotic arm; and
   a pneumatic end effector unit, wherein the pneumatic end effector unit comprises:
   a first base attached to the robotic arm;
   a second base;
   a lapping medium attachable to the second base;
   a bumper coupled to the lapping medium; and
   a pneumatic piston system coupled between the first and second bases.

2. The system of claim 1, wherein the lapping medium comprises an abrasive member adapted to engage the surface.

3. The system of claim 1, further comprising:
   an abrasive pad; and
   a pitch for attaching the abrasive pad to the lapping medium.

4. The system of claim 1, wherein the pneumatic piston system comprises:
   a piston chamber;
   a piston being slideably received within the piston chamber; and
   a component for controlling air pressure within the piston chamber.

5. The system of claim 4, wherein the piston chamber is configured to guide the second base.

6. The system of claim 1, wherein the second base comprises a latch for attaching the lapping medium to the second base.

7. The system of claim 1, further comprising a slurry system coupled to one of the second base or the lapping medium for introducing a slurry compound.

8. A lapping end effector, comprising:
   a first base attachable to a robotic arm;
   a second base;
   a flexible coupling member attachable to the second base;
   a bumper coupled to the flexible coupling member; and
   a pneumatic piston system coupled between the first and second bases.

9. The end effector of claim 8, further comprising:
   a flexible coupling member coupled between the lapping medium and the second base.

10. The end effector of claim 8, further comprising:
    an abrasive pad; and
    a pitch for attaching the abrasive pad to the lapping medium.

11. The end effector of claim 8, wherein the pneumatic piston system comprises:
    a piston chamber;
    a piston being slideably received within the piston chamber; and
    a component for controlling air pressure within the piston chamber.

12. The end effector of claim 11, wherein the piston chamber is configured to guide the second base.

13. The end effector of claim 8, wherein the second base comprises a latch for attaching the lapping medium to the second base.

14. The end effector of claim 8, further comprising a slurry system coupled to one of the second base or the lapping medium for introducing a slurry compound.

15. A lapping end effector for performing an operation on a surface of a workpiece, comprising:
    a first base attachable to a robotic arm;
    a second base attached to the first base;
    a lapping medium attached to the second base; and
    a flexible coupling system coupled between the lapping medium and the second bases, the flexible coupling system configured to flex to allow the lapping medium to at least partially conform to the surface of the workpiece such that an axis of rotation of the lapping medium is non-normal to the surface during performance of the operation.

16. The end effector of claim 15, wherein the first and second bases are coupled by a pneumatic piston system comprising:
    a piston chamber;
    a piston being slideably received within the piston chamber; and
    a component for controlling air pressure within the piston chamber.

17. The end effector of claim 15, wherein the second base comprises a latch for attaching the lapping medium to the second base.

* * * * *